(12) United States Patent
Ameduri et al.

(10) Patent No.: US 9,184,461 B2
(45) Date of Patent: Nov. 10, 2015

(54) CONTROLLED RADICAL COPOLYMERIZATION OF FLUORINATED MONOMERS BY XANTHATE OR TRITHIOCARBONATE

(71) Applicants: Bruno Ameduri, Montpellier (FR); Yogesh Patil, Montpellier (FR)

(72) Inventors: Bruno Ameduri, Montpellier (FR); Yogesh Patil, Montpellier (FR)

(73) Assignees: Arkema France, Colombes (FR); Ecole Nationale Superieure de Chimie de Montpellier, Paris (FR); Centre Nationale de la Recherche Scientifique, Paris (FR)

( * ) Notice: Subject to any disclaimer, the term of this patent is extended or adjusted under 35 U.S.C. 154(b) by 118 days.

(21) Appl. No.: 13/689,816

(22) Filed: Nov. 30, 2012

(65) Prior Publication Data
US 2014/0154611 A1    Jun. 5, 2014

(30) Foreign Application Priority Data
Dec. 1, 2011  (FR) ..................... 11.61017

(51) Int. Cl.
  C08F 2/38   (2006.01)
  H01M 8/10   (2006.01)
  C08F 214/22 (2006.01)

(52) U.S. Cl.
  CPC ............... *H01M 8/1072* (2013.01); *C08F 2/38* (2013.01); *C08F 214/22* (2013.01); *H01M 8/1023* (2013.01); *H01M 8/1039* (2013.01); *C08F 2438/03* (2013.01); *H01M 2008/1095* (2013.01); *Y02E 60/521* (2013.01)

(58) Field of Classification Search
  USPC .......................................... 526/214; 429/492
  See application file for complete search history.

(56) References Cited

FOREIGN PATENT DOCUMENTS

JP    2008-214420 A  * 9/2008
JP    2008214420      9/2008

OTHER PUBLICATIONS

Ameduri. Bruno: Conl:rolled Radical (Co)pol~,'inerization of Fluoromonomers', Macromo[eeules, 2010, vol. 43, Nov. 16, 2010, pp. 10163-10184.*

Ameduri. Bruno: From Vinylidene Fluoride (VDF) to the Applications of VDF-Containing Polymers and Copolymers: Recent Developments and Future Trends', Chemical Review, 2009, vol. 109, Sep. 4, 2009, pp. 6632-6688.*

Ameduri, Bruno: "Controlled Radical (Co)polymerization of Fluoroinotiomers", Macromolecules 2010, vol. 43, Nov. 16, 2010, pp. 10163-10184.

Bruno Ameduri: "From Vinylidene Fluoride (VDF) to the Applications of VDF-Containing Polymers and Copolymers: Recent Developments and Future Trends", Chem. Rev., vol. 109, Apr. 9, 2009, pp. 6632-6686.

* cited by examiner

*Primary Examiner* — Peter D Mulcahy
*Assistant Examiner* — Henry Hu
(74) *Attorney, Agent, or Firm* — Thomas F. Roland

(57) ABSTRACT

The invention relates to a method of preparing a fluorinated copolymer, comprising a step of copolymerization of a fluorinated monomer (of the vinylidene fluoride type) with an α-trifluoromethacrylic acid monomer or derivative of α-trifluoromethacrylic acid, in the presence of a xanthate or trithiocarbonate compound. The invention also relates to copolymers obtained by this method as well as block copolymers comprising a copolymer block prepared according to this method.

6 Claims, 7 Drawing Sheets

CONTROLLED RADICAL COPOLYMERIZATION OF FLUORINATED MONOMERS BY XANTHATE OR TRITHIOCARBONATE

FIELD OF THE INVENTION

The present invention relates to a method of controlled radical copolymerization of fluorinated monomers by a xanthate or trithiocarbonate compound, a method of preparing block copolymers based on the use of this method of copolymerization, as well as the copolymers and block copolymers obtainable by these respective methods.

TECHNICAL BACKGROUND

The fluorinated polymers form a class of compounds having interesting properties for a great many applications, from paints to seals, optics, microelectronics, membrane technology and materials for energy applications (fuel cells, separators and electrolytes for lithium ion batteries, "backsheets" of photovoltaic panels). Among these fluorinated polymers, the copolymers are particularly interesting on account of their variety, morphology, exceptional properties and versatility.

Most copolymerization reactions employed in the prior art for preparing fluorinated copolymers (essentially fluorinated olefins having a double bond) are so-called conventional radical reactions.

Thus, the series of three articles grouped together under the title *Radical Copolymerization of 2-Trifluoromethacrylic Monomers*, by Ito et al., in *Journal of Polymer Science A*, 42: 1468-1527 (2004), deals with the formation of copolymers based on α-trifluoromethacrylic acid.

The document *Radical Copolymerization of α-Trifluoromethacrylic Acid with Vinylidene Fluoride and Vinylidene Fluoride/Hexafluoropropene*, by Souzy et al., in *Macromol. Chem. Phys.* 205: 476-485 (2004), describes a method of conventional copolymerization of vinylidene fluoride and α-trifluoromethacrylic acid.

However, techniques have also been proposed for controlled radical copolymerization, i.e. providing control of the molecular weight and of the polydispersity of the polymers, and the synthesis of copolymers with controlled architectures (block, grafted, alternating, gradient, hyperbranched, etc.). In particular, methods of radical copolymerization controlled by means of xanthate compounds have been described, under the name MADIX, for "Macromolecular Design via Interchange of Xanthates".

The document *Controlled Radical (co)polymerization of fluoromonomers*, by B. Ameduri, in *Macromolecules* 43: 10163-10184 (2010), as well as the document *From Vinylidene Fluoride (VDF) to the Applications of VDF-containing Polymers and Copolymers: Recent Developments and Future Trends*, by B. Ameduri, in *Chem. Rev.* 109: 6632-6686 (2009), are two reviews summarizing relevant works in this field.

The document *First Amphiphilic Poly(vinylidene fluoride-co-3,3,3-trifluoropropene)-b-oligo(vinyl alcohol)Block Copolymers as Potential Nonpersistent Fluorosurfactants from Radical Copolymerization Controlled by Xanthate*, by Kostov et al., in *Macromolecules* 44: 1841-1855 (2011), describes the manufacture of fluorinated block copolymers based on a technique of the MADIX type.

The document *Living/controlled free radical copolymerization of chlorotrifluoroethene and butyl vinyl ether under $^{60}Co$ γ-ray irradiation in the presence of S-benzyl O-ethyl dithiocarbonate*, by Liu et al., in *Chem. Comm.*, 47: 7839-7841 (2011), provides another example of a method of copolymerization controlled by xanthate but considers copolymers based on CTFE and vinyl ethers exclusively.

The document *Iodine Transfer Copolymerization of Vinylidene Fluoride and α-Trifluoromethacrylic Acid in Emulsion Process without Any Surfactants*, by Boyer et al., in *Journal of Polymer Science A*, 47: 4710-4722 (2009), describes the synthesis of copolymers of vinylidene fluoride and α-trifluoromethacrylic acid using iodine compounds as chain transfer agents.

However, there is still a need to develop new fluorinated copolymers, in particular by means of methods of controlled radical copolymerization.

SUMMARY OF THE INVENTION

The invention relates firstly to a method of preparing a fluorinated copolymer, comprising a step of copolymerization of a vinylidene fluoride monomer with an α-trifluoromethacrylic acid (or 2-trifluoromethacrylic acid) monomer or derivative of α-trifluoromethacrylic acid, in the presence of a xanthate or trithiocarbonate compound.

According to one embodiment, the derivative of α-trifluoromethacrylic acid is an alkyl α-trifluoromethacrylate ester, preferably selected from t-butyl α-trifluoromethacrylate, ethyl α-trifluoromethacrylate, α-trifluoromethyl methacrylate, 2,2,2-trifluoroethyl α-trifluoromethacrylate, and hexafluoroisopropyl α-trifluoromethacrylate.

Advantageously, the xanthate or trithiocarbonate compound is a compound of formula $R_1$—S—C(=S)—Z, in which $R_1$ represents an aliphatic group having from 1 to 20 carbon atoms, —Z represents a group —O—$R_2$ in which $R_2$ represents an alkyl or aryl group having from 1 to 10 carbon atoms and optionally a halogen, or —Z represents a group —S—$R_3$, in which $R_3$ represents an aliphatic group having from 1 to 20 carbon atoms.

According to one embodiment, the xanthate or trithiocarbonate compound is O-ethyl-S-(1-methyloxycarbonyl)ethyl xanthate or 2-methyl ester of mercaptopropionic acid O-ethyl dithiocarbonate whereas the trithiocarbonate is 2-(dodecylthiocarbonothioylthio)-2-methylpropanoic acid.

The invention also relates to a method of preparing a block copolymer, comprising a step of reaction of a copolymer (a) of vinylidene fluoride and α-trifluoromethacrylic acid or derivative of α-trifluoromethacrylic acid, said copolymer (a) having a xanthate or trithiocarbonate termination, with a comonomer (b). The resultant products can be either $R_1$[VDF-co-TFMA-tBu]nSC(S)S$R_3$, or $R_1$[VDF-co-TFMA-tBu]nSC(S)S[VDF-co-TFMA-tBu]m$R_3$, $R_3$ being an aliphatic group having from 1 to 20 carbon atoms that can be partially halogenated.

According to one embodiment, the xanthate or trithiocarbonate termination of copolymer (a) is a group —S—C(=S)—Z, —Z representing a group —O—$R_2$ in which $R_2$ represents an alkyl or aryl group having from 1 to 10 carbon atoms and that can be partially halogenated or —Z representing a group —S—$R_3$, in which $R_3$ represents an aliphatic group having from 1 to 20 carbon atoms that can be partially halogenated.

According to one embodiment, the xanthate termination of copolymer (a) is a group —S—C(=S)—O—$C_2H_5$ whereas that of the trithiocarbonate is either $R_4$ or SC(S)S[VDF-co-TFMA-tBu]n$R_5$, $R_4$ and $R_5$ being alkyl groups that can be partially halogenated.

According to one embodiment, comonomer (b) is selected from vinylidene fluoride, vinyl acetate, N-vinyl pyrrolidone, methacrylates, acrylates, acrylamide, N-vinylcarbazole, acrylonitrile.

According to one embodiment, copolymer (a) is a copolymer of vinylidene fluoride and α-trifluoromethacrylate ester, which is preferably selected from t-butyl α-trifluoromethacrylate, ethyl α-trifluoromethacrylate, α-trifluoromethyl methacrylate, 2,2,2-trifluoroethyl α-trifluoromethacrylate and hexafluoroisopropyl α-trifluoromethacrylate.

According to one embodiment, the method comprises a preliminary step of preparing copolymer (a) according to the method described above.

The invention also relates to the synthesis of a copolymer of vinylidene fluoride and α-trifluoromethacrylic acid or derivative of α-trifluoromethacrylic acid, having a xanthate or trithiocarbonate termination.

According to one embodiment, the xanthate or trithiocarbonate termination is a group —S—C(=S)—Z, —Z representing a group —O—R$_2$ in which R$_2$ represents an alkyl or aryl group having from 1 to 10 carbon atoms or —Z representing a group —S—R$_3$, in which R$_3$ represents an aliphatic group having from 1 to 20 carbon atoms.

According to one embodiment, the xanthate or trithiocarbonate termination is a group —S—C(=S)—O—C$_2$H$_5$.

According to one embodiment, the above copolymer is a copolymer of vinylidene fluoride and α-trifluoromethacrylate ester, which is preferably selected from t-butyl α-trifluoromethacrylate, ethyl α-trifluoromethacrylate, α-trifluoromethyl methacrylate, 2,2,2-trifluoroethyl α-trifluoromethacrylate and hexafluoroisopropyl α-trifluoromethacrylate.

The invention also relates to a block copolymer having a block (a) that is a copolymer of vinylidene fluoride and α-trifluoromethacrylic acid or derivative of α-trifluoromethacrylic acid, and a homopolymer block (b).

According to one embodiment, block (a) is a copolymer of vinylidene fluoride and α-trifluoromethacrylate ester, which is preferably selected from t-butyl α-trifluoromethacrylate, ethyl α-trifluoromethacrylate, α-trifluoromethyl methacrylate, 2,2,2-trifluoroethyl α-trifluoromethacrylate and hexafluoroisopropyl α-trifluoromethacrylate.

According to one embodiment, block (b) is a polyvinylidene fluoride, polyvinyl acetate, polyvinylpyrrolidone, poly(alkyl methacrylate), poly(alkyl acrylate), polyacrylamide, polyvinylcarbazole or polyacrylonitrile block, or a copolymer of the VDF and another comonomer, such as poly(VDF-co-vinyl fluoride), poly(VDF-co-HFP), poly(VDF-co-PMVE), poly(VDF-co-PPVE), poly(VDF-co-3,3,3-trifluoropropene), poly(VDF-co-1H-pentafluoropropene), poly(VDF-co-2H-pentafluoropropene), poly(VDF-co-vinyl fluoride), poly(VDF-co-PFSVE), poly(VDF-co-HFP), poly(VDF-co-HFP), poly(VDF-co-HFP), or poly(VDF-E-TFE).

The invention also relates to a membrane comprising at least one copolymer or block copolymer as described above.

The invention also relates to a fuel cell device comprising at least one aforementioned membrane.

According to certain particular embodiments, the invention also has one or preferably several of the advantageous characteristics enumerated below.

The use of the xanthate or trithiocarbonate compound makes it possible to control the copolymerization reaction of vinylidene fluoride (designated VDF hereinafter) and α-trifluoromethacrylic acid (designated TFMA hereinafter) or of the TFMA derivative.

The invention makes it possible to obtain a great variety of block copolymers from the poly(VDF-co-TFMA) copolymer having a xanthate or trithiocarbonate termination, and any comonomer.

The copolymers according to the invention can be functionalized in many different ways owing to the presence of the TFMA monomer or TFMA derivative. For example, these copolymers can be used for subsequent steps of crosslinking or grafting. As an illustration, graft copolymers can be prepared by transesterification of COO-alkyl groups (where the term "alkyl" denotes methyl, ethyl, propyl and t-butyl).

DESCRIPTION OF EMBODIMENTS OF THE INVENTION

Figure 1:
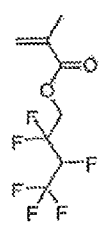
FIG. 1 to 32 show formulae of examples of molecules that can be used as comonomers for making the block copolymers according to the invention.
Figure 2:
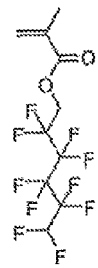
Figure 3:
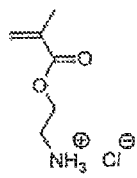
Figure 4:
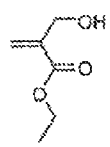
Figure 5:
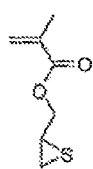
Figure 6:
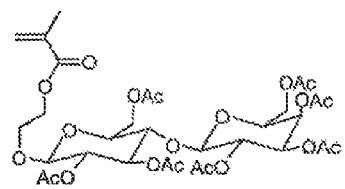
Figure 7:
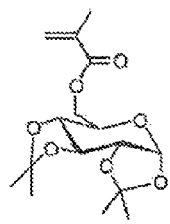
Figure 8:
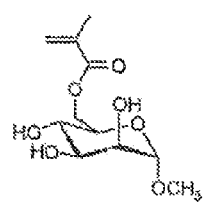
Figure 9:
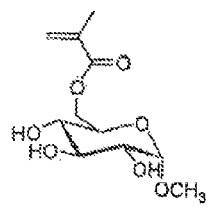
Figure 10:
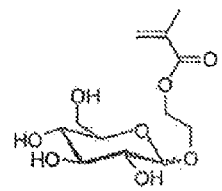
Figure 11:
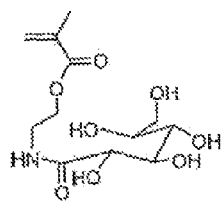
Figure 12:
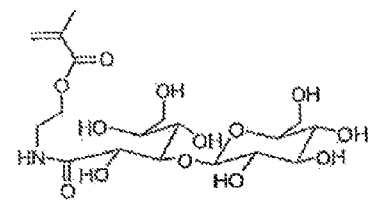
Figure 13:
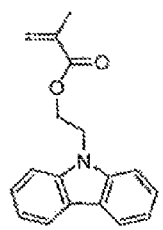
Figure 14:
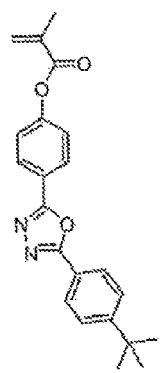
Figure 15:
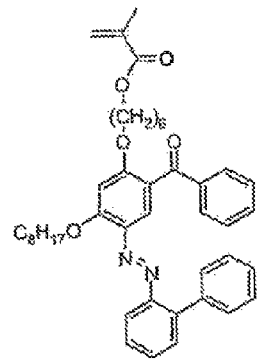
Figure 16:
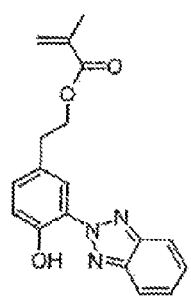
Figure 17:
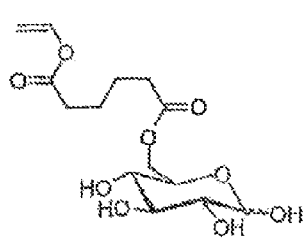
Figure 18:
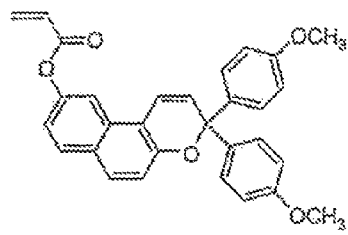
Figure 19:
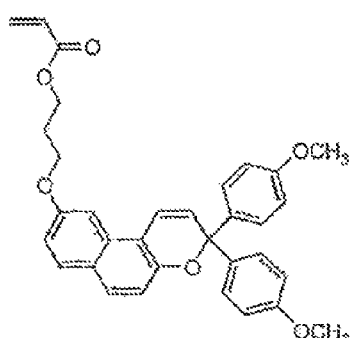
Figure 20:
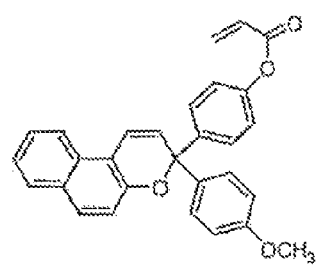
Figure 21:
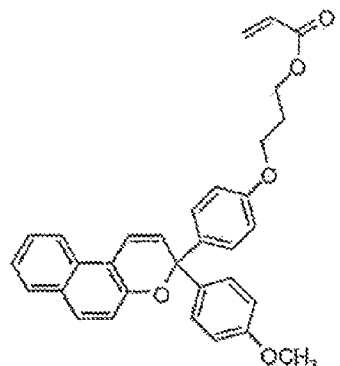
Figure 22:
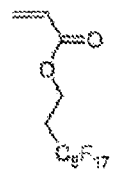
Figure 23:
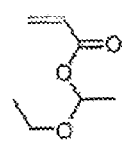
Figure 24:
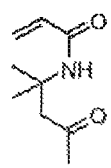
Figure 25:
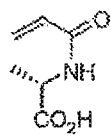
Figure 26:
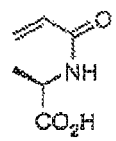
Figure 27:
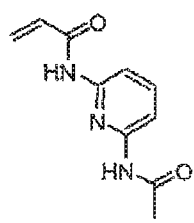
Figure 28:
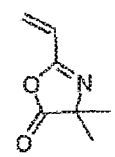
Figure 29:
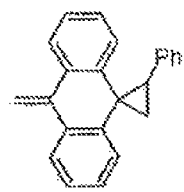
Figure 30:
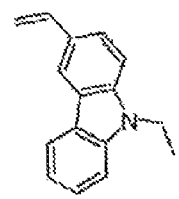
Figure 31:
Figure 32:
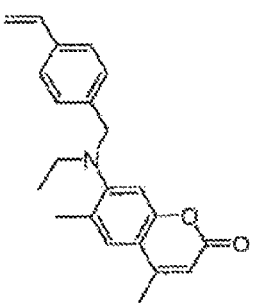

The invention is now described in more detail and in a non-limiting manner in the following description.

The invention envisages obtaining a copolymer by a reaction of radical copolymerization between VDF and TFMA or a TFMA derivative, in the presence of a xanthate or trithiocarbonate compound as chain transfer agent, for controlling the copolymerization reaction.

As TFMA derivative, notably an ester of TFMA can be used, and in particular t-butyl α-trifluoromethacrylate, or t-butyl 2-trifluoromethacrylate, designated TFMA-tBu here. More generally, the TFMA derivative can be an alkyl α-trifluoromethacrylate. Other particular examples are ethyl α-trifluoromethacrylate, α-trifluoromethyl methacrylate, 2,2,2-trifluoroethyl α-trifluoromethacrylate, and hexafluoroisopropyl α-trifluoromethacrylate.

The use of TFMA makes it possible to employ auto-emulsification in the context of emulsion or suspension polymerization.

The copolymer obtained is designated poly(VDF-co-TFMA), or poly(VDF-co-TFMA-tBu) etc., as appropriate.

Preferably, the xanthate or trithiocarbonate compound is a compound of formula (I):

$$R_1—S—C(=S)—Z, \quad (I)$$

in which R$_1$ represents an aliphatic group (preferably alkyl) having from 1 to 20 carbon atoms, —Z represents a group —O—R$_2$ in which R$_2$ represents an alkyl or aryl group having from 1 to 10 carbon atoms (in this case it is a xanthate compound) or —Z represents a group —S—R$_3$, in which R$_3$ represents an aliphatic group (preferably alkyl) having from 1 to 20 carbon atoms (in this case it is a trithiocarbonate compound).

It was found that the absence of aromatic groups in $R_1$ and/or $R_3$ tends to improve the yield of the reaction.

The groups $R_1$, $R_2$ and $R_3$ can be substituted or unsubstituted, and preferably are unsubstituted. Preferably, $R_1$, $R_2$ and $R_3$ are linear or branched groups, and preferably they are saturated groups, and can also be partially halogenated.

The poly(VDF-co-TFMA) copolymer obtained has a xanthate or trithiocarbonate termination, i.e. a group —S—C(=S)—Z, where Z has the meaning given above, located at the end of the chain.

The reaction is carried out in the presence of an initiator. The latter can be for example tert-butyl peroxypivalate, bis(4-tert-butyl cyclohexyl) peroxydicarbonate, tert-butyl peroxide or sodium, ammonium or potassium persulphates.

The reaction is carried out in a solvent, which is for example selected from 1,1,1,3,3-pentafluorobutane, acetonitrile, methyl ethyl ketone, 2,2,2-trifluoroethanol, carbonates (of ethylene or of propylene) or mixtures thereof, or in water.

The reaction is preferably carried out at a temperature from 20 to 180° C., preferably from 35 to 140° C., and at a pressure from 10 to 100 bar, preferably from 20 to 70 bar. The choice of optimum temperature depends on the initiator that is used.

The initial molar ratio of the amount of chain transfer agent to the amount of monomers makes it possible to control the molecular weight of the copolymer. Preferably, this ratio is from 0.001 to 0.02, and more preferably from 0.005 to 0.01.

The initial molar ratio of the amount of monomer VDF to the amount of monomer TFMA or TFMA derivative can be for example from 1 to 9, preferably from 2 to 4. The higher this ratio, the higher the proportion of VDF in the copolymer obtained, the higher the thermal stability of the copolymer, the higher the molecular weight of the copolymer, and the more hydrophobic the copolymer.

The molecular weight of the copolymer obtained is preferably from 800 to 400 000 g/mol, more preferably from 1500 to 100 000 g/mol. The higher the molecular weight, the better the properties of the materials obtained.

The polydispersity index of the copolymer obtained is preferably from 1.2 to 2.2, more preferably from 1.3 to 1.9.

The copolymer obtained by this synthesis technique, on account of its xanthate or trithiocarbonate termination, or its structure $R_1[VDF\text{-co-}TFMA\text{-}tBu]_nSC(S)S[VDF\text{-co-}TFMA\text{-}tBu]_mR_5$ ($R_1$ and $R_5$ are alkyl groups as defined above), can be used together with a comonomer for preparing a block copolymer.

The comonomer can be selected for example from vinylidene fluoride, vinyl acetate, N-vinylpyrrolidone, methacrylates, acrylates, acrylamide (and its derivatives), N-vinylcarbazole and acrylonitrile.

The comonomer used can be for example one of the molecules listed in FIGS. 1 to 32.

Conditions similar to those described above can be used for this reaction. The molar ratio of the amount of comonomers to the amount of copolymer with xanthate or trithiocarbonate termination is preferably from 1 to 100, more preferably from 2 to 50.

The copolymers obtained according to the invention are useful notably for making electrolytes or for making membranes (for example for fuel cells).

EXAMPLES

The following examples illustrate but do not limit the invention.

Example 1

List of Reagents and Equipment Used

The TFMA-tBu is from Tosoh F-Tech (Shunan, Japan).

The VDF and the 1,1,1,3,3-pentafluorobutane (Solkane® 365 mfc) are from Solvay SA (Tavaux, France and Brussels, Belgium).

The bis(4-tert-butyl cyclohexyl) peroxydicarbonate (Perkadox® 16S) and the tert-butyl peroxypivalate in a solution of isododecane (Trigonox® 25-C75, TBPPi, purity 75%) are from Akzo Nobel (Chalons sur Marne, France).

The vinyl acetate (VAc) is from Sigma-Aldrich (Saint Quentin-Fallavier, France) and is distilled on calcium hydride before use.

The deuterated solvents (chloroform and acetone, purity>99.8%) used for NMR spectroscopy are from Euroiso-top (Grenoble, France).

The acetonitrile, methyl ethyl ketone (MEK) and the 2,2,2-trifluoroethanol are from Fisher Scientific and Acros Organics respectively.

The O-ethyl-S-(1-methyloxycarbonyl)ethylxanthate was synthesized by the technique described in the article by Girard, E., Tassaing, T., Marty, J. D. and Destarac, M., *Polym. Chem.* 2011, 2: 2222-2230.

The NMR spectra are recorded on a Bruker AC 400 instrument, using deuterated chloroform or deuterated acetone as solvent, and tetramethylsilane (TMS) or $CFCl_3$ as reference for the $^1H$ or $^{19}F$ nuclei. The coupling constants and chemical shifts are given in Hz and in ppm, respectively. The experimental conditions for recording the $^1H$ (or $^{19}F$) NMR spectra are as follows: tilt angle of 90° (or 30°), acquisition time 4.5 s (or 0.7 s), pulse delay 2 s (or 5 s), number of scans 36 (or 64), and pulse width of 5 μs for $^{19}F$ NMR.

Size exclusion chromatography (SEC) is carried out in tetrahydrofuran at 30° C., at a flow rate of 0.8 mL/min, with a Spectra Physics Winner station, a Waters Associates R 401 differential refractometer and a set of four columns connected in series: Styragel (Waters) HR4 5 m, HR3 analyses 5 m, PL Gel (Polymer Laboratories) 5 m 100 Å. For the experiments with a high proportion of VDF, dimethylformamide with 5% of LiBr is used. Isomolecular standards (PMMA) are used for calibration. Aliquots are taken from the reaction mixture, diluted in tetrahydrofuran to a predetermined concentration ($C_{p,t}$) of about 4%, filtered with a PTFE Chromafil 20 mm membrane and finally analysed by GPC in the conditions described above.

The IR spectra are recorded on a Fourier transform infrared (FTIR) spectrometer Nicolet 510P from tablets of KBr (10%), and the intensities of the absorption lines ($cm^{-1}$) are designated: strong (str), medium (med), or weak (w). The accuracy is ±2 $cm^{-1}$.

The thermogravimetric analyses are carried out with a TGA 51 instrument from TA Instruments, in the presence of air, at a heating rate of 10° C. $min^{-1}$ from room temperature up to a maximum of 600° C. The sample taken varies from 10 to 15 mg.

The differential scanning calorimetry (DSC) measurements are carried out with a Perkin Elmer Pyris 1 instrument. The scans are recorded at a heating rate of 20° C. $min^{-1}$ from −80 to +150° C., and the cooling rate is 20° C. $min^{-1}$. A second scan is necessary for evaluating $T_g$, defined as the point of inflexion in the increase of heat capacity. The sample taken is about 10-15 mg.

The contact angles were measured with the apparatus Contact Angle System OCA-Data Physics. The hanging drop method was employed, measuring the angle that the tangent to the curve from the drop makes with the horizontal at room temperature. The arithmetic mean was determined from five measurements of water drops of volume 1 μL deposited on the same sample.

The radical copolymerizations of the VDF and TFMA-tBu are carried out in a Hastelloy autoclave (HC 276) from Parr of 100 mL equipped with a manometer, a mechanical Hastelloy anchor, a bursting disc (3000 PSI), and inlet and outlet valves. An electronic device regulates and controls both the stirring and the heating of the autoclave. Before the start of the reaction, the autoclave is pressurized to 30 bar with nitrogen for 1 hour to check that there are no leaks. The autoclave is then prepared for the reaction with several nitrogen/vacuum cycles ($10^{-2}$ mbar) to remove all traces of oxygen. The liquid and dissolved solid reactants are introduced with a funnel attached hermetically to the autoclave, and then gaseous VDF is introduced by double weighing (i.e. according to the weight difference before and after filling the autoclave with the gases).

Example 2

Synthesis of poly(VDF-co-TFMA-tBu) Copolymer

The 100 mL Hastelloy autoclave is filled under vacuum with O-ethyl-S-(1-methyloxycarbonyl)ethyl xanthate (2.0 g, 1 mmol), TFMA-tBu (20 g, 0.1 mol) and bis(4-tert-butyl cyclohexyl) peroxydicarbonate as initiator (3.05 g, 8.1 mol) dissolved in a solvent, which is a mixture of 1,1,1,3,3-pentafluorobutane (30 mL) and dry acetonitrile (30 mL). The reactor is cooled in a bath of acetone/liquid nitrogen and three cycles of freezing/thawing are applied before the fluorinated VDF gas (27 g, 0.4 mol) condenses in the autoclave with controlled weighing. Then the reactor is stirred and heated gradually to 60° C. and the variation of pressure and temperature is recorded. An increase of pressure to 33 bar, and a decrease to 24 bar in 3 hours are observed. The reaction is stopped after 6 hours and the autoclave is cooled to room temperature and put in an ice bath. After purging of unreacted monomer, the conversion of the gaseous monomer is determined by double weighing (51%). A light yellow liquid is obtained. The solvent is removed completely by distillation. The product is precipitated in iced pentane, filtered and dried under vacuum ($10^{-2}$ bar, 40° C.) for 6 hours. The poly(VDF-co-TFMA-tBu) copolymer, in the form of yellowish powder, is characterized by $^1$H and $^{19}$F NMR spectroscopy. The calculated yield by weight is 41%.

$^1$H NMR (acetone) δ (ppm): 4.6 (CH$_3$CH(COOC H$_3$)SC(S)— of the xanthate end group); 4.3 (CH$_3$CH$_2$O of the xanthate end group); 3.9 (t, $^3J_{HF}$=15 Hz CF$_2$CH$_2$SC(S)OEt of the VDF); 3.5 (CH$_3$OOC(CH)— of the xanthate end group); 2.8 (CH$_2$ of the VDF and —CH$_2$C(CF$_3$)COOtBu of the TFMA-tBu); 1.8 (tert-butyl-C(CH$_3$)$_3$) of the TFMA-tBu); 1.3 (CH$_3$ of the xanthate end group); 1.1 (t, $^3J_{HF}$=7 Hz, C H$_3$CH$_2$O of the xanthate end group).

$^{19}$F NMR (acetone) δ (ppm): −101 to −106 (CF$_2$ of the VDF inverted head to head attached to the xanthate end group, —CH$_2$CF$_2$CF$_2$CH$_2$—S—C(S)—OEt); −91.5 (CF$_2$ of the VDF, normal head to tail addition); −95 (alternating dyad VDF-TFMA-tB-CH$_2$CF$_2$CH$_2$C(CF$_3$CO$_2$tBu)-); −71.5 (—CH$_2$CF$_2$—S—C(S)—OEt, end chain of the VDF adjacent to the xanthate); −69 (CF$_3$ of the TFMA-tBu); −66 to −68 (inverse addition of TFMA-tBu).

GPC: $M_n$=2500 g·mol$^{-1}$, $M_w$=3600 g·mol$^{-1}$, PDI=1.4.

FT-IR (cm$^{-1}$)=2985 (str, C—H), 1723 (str, C=O), 1305-1050 (med-str, C—F), 858 (med, C=S), 768 (med, C—O).

TGA: (in air, 5° C. min$^{-1}$) $T_{d,10\%}$=180° C. Contact angle (water drop)=95°.

Figure 33:
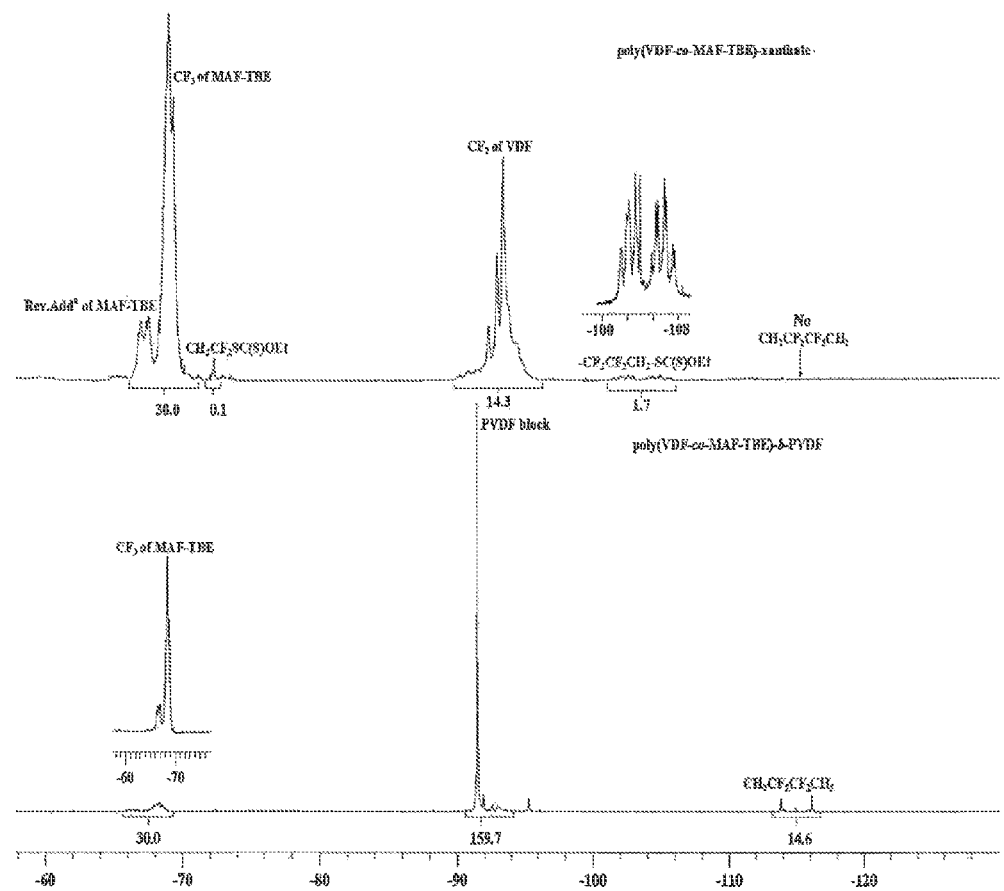
FIG. 33 shows a $^1$H NMR spectrum in deuterated acetone of a poly(VDF-co-TFMA-tBu) copolymer with xanthate termination (top spectrum) and of a poly(VDF-co-TFMA-tBu)-b-PVAc block copolymer (bottom spectrum). The chemical shift in ppm is shown on the abscissa.
Figure 34:
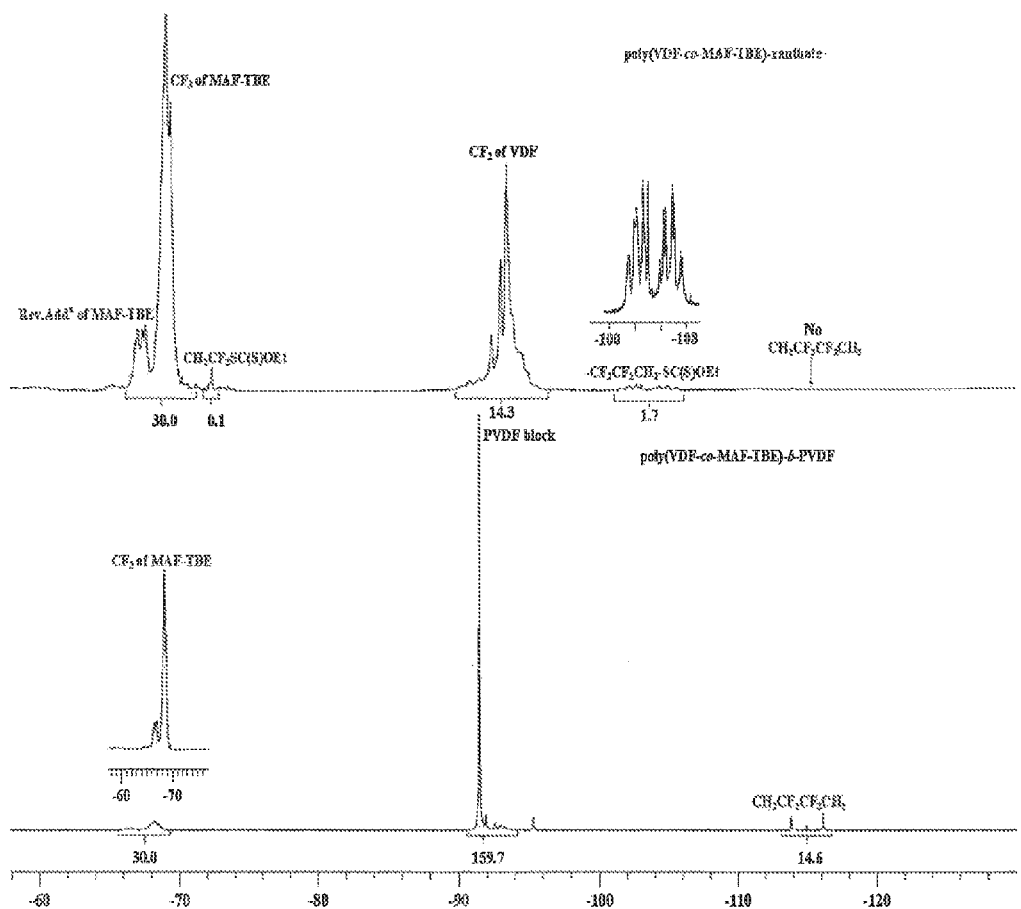
FIG. 34 shows a $^{19}$F NMR spectrum in deuterated acetone of a poly(VDF-co-TFMA-tBu) copolymer with xanthate termination (top spectrum) and of a poly(VDF-co-TFMA-tBu)-b-PVDF block copolymer (bottom spectrum). The chemical shift in ppm is shown on the abscissa.
Figure 35:
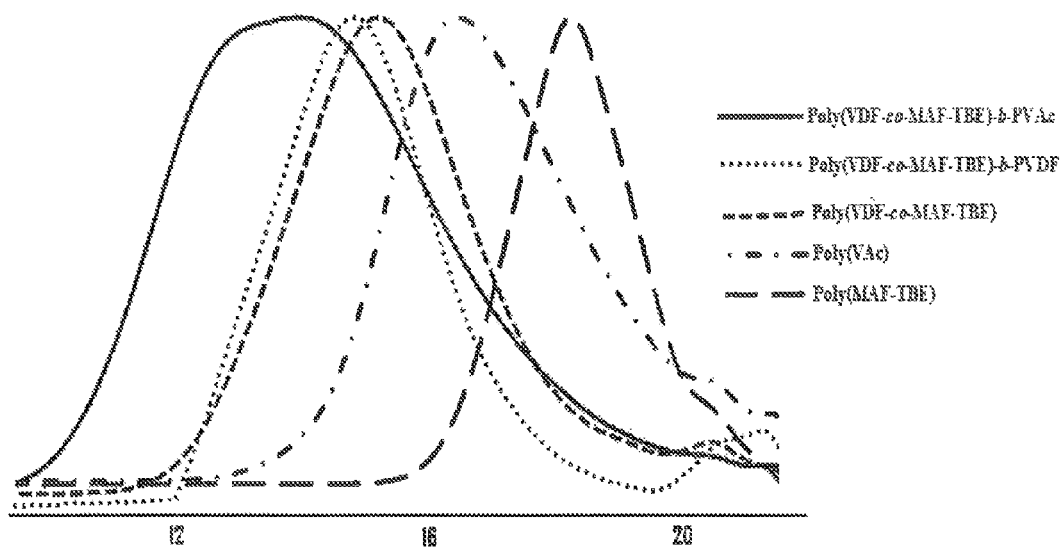
FIG. 35 shows one of the size exclusion chromatograms of two homopolymers (PVAc and TFMA-tBu homopolymer), of a copolymer (poly(VDF-co-TFMA-tBu) with xanthate termination) and of two block copolymers (poly(VDF-co-TFMA-tBu)-b-PVAc and poly(VDF-co-TFMA-tBu)-b-PVDF). The elution time of the solvent in minutes is shown on the abscissa. The highest molecular weights correspond to the shortest retention times.

The NMR spectra of the copolymer are the top spectra in FIGS. 33 and 34. The SEC chromatogram of the copolymer is shown in FIG. 35 (curve of the medium drawn with small dashes). These graphs illustrate the control of polymerization that is obtained according to the invention.

The synthesis described above is preceded by preliminary tests of homopolymerization of VAc, of TFMA-tBu and of VDF in similar reaction conditions. At the end of these tests, for TFMA-tBu, a white waxy substance is obtained, consisting of oligomer of low molecular weight. Conversely, VDF and VAc polymerize correctly and produce polymers of high molecular weights at good yields.

The SEC chromatograms of the PVAc homopolymer and of the TFMA-tBu homopolymer are also shown in FIG. 35 (straight lines, dot-and-dash, and large dashes).

Moreover, other syntheses of poly(VDF-co-TFMA-tBu) are carried out, varying certain conditions, namely:
 the initial molar ratio of VDF and of TFMA-tBu,
 the amount of initiator or its nature (tert-butylperoxypivalate [TBPPi] instead of bis(4-tert-butyl cyclohexyl) peroxydicarbonate [BTBCP]),
 the nature of the chain transfer agent: aliphatic trithiocarbonate (TTC) such as 2-(dodecylthiocarbonothioylthio)-2-methylpropanoic) acid, or absence of chain transfer agent, and
 the nature of the solvent (2,2,2-trifluoroethanol [TFE] and acetonitrile [AN], or 1,1,1,3,3-pentafluorobutane [PFB] and acetonitrile [AN], or 1,1,1,3,3-pentafluorobutane [PFB] and methyl ethyl ketone [MEK]).

All the conditions used and results obtained for these syntheses are summarized in Table 1.

TABLE 1

| N° | 1 | 2 | 3 | 4 | 5 | 6 | 7 |
|---|---|---|---|---|---|---|---|
| Feed: [VDF] | 100 | 0 | 0 | 80 | 95 | 80 | 80 |
| [TFMA-tBu] | 0 | 100 | 0 | 20 | 5 | 20 | 20 |
| [VAc] | 0 | 0 | 100 | 0 | 0 | 0 | 0 |
| Copol.: VDF | 100 | 0 | — | 56 | 89 | 46 | 40 |
| TFMA-tBu | 0 | 100 | — | 44 | 11 | 54 | 60 |
| Initiator | BTBCP (0.015) | BTBCP (0.015) | BTBCP (0.015) | BTBCP (0.015) | BTBCP (0.015) | BTBCP (0.015) | BTBCP (0.015) |
| Chain transfer agent | Xanth. (1.5) | — | Xanth. (1.5) | — | Xanth. (1.5) | Xanth. (1.5) | Xanth. (1.5) |
| Solvent | PFB + AN | PFB + AN | AN | PFB + AN | PFB + AN | PFB + AN | PFB + AN |
| Pmax | — | — | — | 38 | 39 | 33 | 28 |
| ΔP (bar) | — | — | — | 10 | 15 | 9 | 7 |

TABLE 1-continued

| Yield | 75 | 15 | 82 | 45 | 47 | 41 | 21 |
|---|---|---|---|---|---|---|---|
| $M_n$ (NMR) | 6000 | — | — | — | 6290 | 16200 | 49300 |
| $M_n$ (SEC) | 7400 | 900 | 1000 | 4200 | 1500 | 2500 | 3400 |
| PDI | 1.7 | 1.2 | 1.8 | 1.5 | 1.6 | 1.4 | 1.6 |
| $T_{d, 10\%}$ | — | — | — | 180 | 242 | 179 | 164 |
| $\theta_{H2O}$ | — | — | — | 98 | 99 | 95 | 83 |

| N° | | 8 | 9 | 10 | 11 | 12 |
|---|---|---|---|---|---|---|
| Feed: | [VDF] | 80 | 80 | 80 | 80 | 80 |
| | [TFMA-tBu] | 20 | 20 | 20 | 20 | 20 |
| | [VAc] | 0 | 0 | 0 | 0 | 0 |
| Copol.: | VDF | 45 | 41 | 49 | 43 | 48 |
| | TFMA-tBu | 55 | 59 | 51 | 57 | 52 |
| | Initiator | BTBCP (0.008) | BTBCP (0.015) | BTBCP (0.015) | TBPPi (0.015) | BTBCP (0.015) |
| | Chain transfer agent | Xanth. (0.8) | Xanth. (1.5) | Xanth. (1.5) | Xanth. (1.5) | TTC (1.5) |
| | Solvent | PFB + AN | PFB + MEK | TFE + AN | PFB + AN | PFB + AN |
| | Pmax | 40 | 32 | 41 | 41 | 50 |
| | ΔP (bar) | 8 | 6 | 9 | 10 | 10 |
| | Yield | 35 | 17 | 37 | 42 | 47 |
| | $M_n$ (NMR) | 48740 | 7050 | 15000 | 15900 | 18250 |
| | $M_n$ (SEC) | 3300 | 1600 | 2400 | 2500 | 2350 |
| | PDI | 1.4 | 1.5 | 1.6 | 1.6 | 1.4 |
| | $T_{d, 10\%}$ | 170 | — | 177 | 180 | 179 |
| | $\theta_{H2O}$ | 104 | — | 97 | 119 | 96 |

The lines "Feed" indicate the molar proportion of each of the reactants in the feed.

The lines "Copol." indicate the molar proportion of VDF and of TFMA-tBu in the copolymer obtained, as determined by $^{19}F$ NMR spectroscopy.

The figures in parentheses in the line "initiator" correspond to the molar ratio of the initial amount of initiator to the initial amount of monomers.

The figures in parentheses in the line "chain transfer agent" correspond to the molar ratio of the initial amount of initiator to the initial amount of chain transfer agent. In the table, "Xanth." denotes O-ethyl-S-(1-methyloxycarbonyl)ethyl xanthate, and "TTC" denotes 2-(dodecylthiocarbonothioylthio)-2-methylpropanoic acid.

The maximum pressure $P_{max}$ and the pressure difference ΔP are given in bar.

The yield is shown in %.

The molecular weight $M_n$ (NMR) is the molecular weight determined by NMR spectroscopy.

The molecular weight $M_n$ (SEC) is the molecular weight determined by SEC.

"PDI" denotes the polydispersity index, determined by SEC.

"$T_{d,10\%}$" represents the result of measurement of thermal stability or TGA (in ° C.), in air, at 5° C./min.

"$\theta_{H2O}$" represents the average experimental value of a water drop angle measurement (in °), using the sessile drop method.

The synthesis described in detail above is synthesis No. 6 in the table.

Comparison of syntheses No. 4 and 6 shows that the polymerization is not disturbed by the presence of xanthate.

Comparison of syntheses No. 5, 6 and 7 (with various molar ratios of reactants VDF and TFMA-tBu) shows that the higher the proportion of VDF, the higher the proportion of VDF in the copolymer, and the better the yield, but conversely, the molecular weight decreases. The pressure also increases with the proportion of VDF in the feed and in the copolymer. A high content of VDF in the copolymer is also reflected in a more hydrophobic copolymer and a higher degradation temperature, whereas a high content of TFMA-tBu in the copolymer makes the polymer more hydrophilic and more susceptible to degradation.

Lowering the content of initiator and of chain transfer agent (synthesis No. 8) leads to a slight decrease in yield, but the copolymer displays similar characteristics.

The use of MEK in the solvent (synthesis No. 9) leads to a reduction in yield and a lower molecular weight. The use of TFE in the solvent (synthesis No. 10) does not lead to significant differences in yield or in other characteristics.

The use of TBPPi as initiator (synthesis No. 11) also does not lead to significant differences in yield or in other characteristics.

Conversely, the choice of chain transfer agent has a strong effect on the yield. Aliphatic TTC (synthesis No. 12) leads to a good yield, comparable to that of the xanthate (synthesis No. 5).

Example 3

Synthesis of poly(VDF-co-TFMA-tBu)-b-poly(VAc)

A poly(VDF-co-TFMA-tBu) copolymer having a xanthate end group is used as macroinitiator (obtained from synthesis 6 in the above table). It is put (3.05 g, 0.1 mmol) in a 100-mL round-bottomed two-neck flask with bis(4-tert-butyl cyclohexyl) peroxydicarbonate (0.50 g, 0.1 mmol), and 50 mL of acetonitrile. Then VAc is added (5.02 g, 6 mmol) and the temperature is raised to 60° C. The reaction is stopped after 16 hours, and the reaction mixture is cooled to room temperature. The solvent is evaporated and the product is precipitated in iced pentane. The block copolymer obtained is dried under vacuum ($10^{-2}$ bar, 40° C.) and then analysed by $^1H$, $^{19}F$ NMR and by SEC. The yield is 80%.

$^1H$ NMR (CDCl$_3$) δ (ppm): 4.80 (CH of VAc); 3.95 (—CH$_2$C(CF$_3$)COOtBu of TFMA-tBu); 3.6 (CH$_3$OOC(CH)— of xanthate, very weak); 2.7 (CH$_2$ of VDF attributed to normal head-to-tail dyads); 2.1 (—CH$_2$— of VAc); 1.95 (—CH$_2$CH (OCOCH₃)— of VAc); 1.8 (signals of the VDF CH₂ attributed to inverted tail-to-tail dyads overlapping with broad signals of the PVAc block); 1.35 (tert-butyl —C(CH₃)₃) of TFMA-tBu).

This spectrum is shown at the bottom of FIG. 33.

$^{19}$F NMR (CDCl₃) δ (ppm): −100 to −106 (absence of —CH₂CF₂CF₂CH₂—S—, absence of VDF-VDF head-to-head addition); −91 to −95 (CF₂ of the VDF, normal addition, head to tail); −71.5 (absence of —CH₂CF₂—S—C(S)—OEt, VDF of chain termination adjacent to xanthate); −69 (CF₃ of TFMA-tBu); −66 to −68 (inverted addition of TFMA-tBu).

GPC: $M_n$=3200 g·mol$^{-1}$, $M_w$=6000 g·mol$^{-1}$, PDI=1.9.

The SEC chromatogram is shown in FIG. 35 (curve on left, solid line).

FTIR (cm$^{-1}$): 2985 (str, C—H), 1723 (str, C=O), 1305-1050 (med-str, C—F), 858 (w, C=S), 768 (med, C—O). TGA: (in air, 5° C. min$^{-1}$) $T_{d,10\%}$=217° C. Contact angle of a water drop=82°.

Example 4

Synthesis of
poly(VDF-co-TFMA-tBu)-b-poly(VDF)

The HC 276 Hastelloy autoclave is filled under vacuum with poly(VDF-co-TFMA-tBu) having a xanthate end group (from synthesis 6 in the table above) as macroinitiator (3.05 g, 0.1 mmol), as well as with bis(4-tert-butyl cyclohexyl) peroxydicarbonate as initiator (0.50 g, 0.1 mmol), both dissolved in a medium consisting of 1,1,1,3,3-pentafluorobutane and acetonitrile (60 mL). The reactor is cooled in a bath of acetone/liquid nitrogen to condense the gaseous VDF (15 g, 0.24 mol) in the autoclave, while monitoring the weight. It is then heated gradually to 60° C. and the variations of pressure and temperature are recorded. An increase in pressure to 22 bar, followed by a decrease to 11 bar, are observed during the reaction. The reaction is stopped after 6 hours and the autoclave is cooled to room temperature and put in an ice bath. After purging of the unreacted VDF monomer, the conversion of the gaseous monomer (VDF) is determined by double weighing (66%). A brown coloured liquid is obtained. The solvent is removed completely by distillation and the product is precipitated in iced pentane, and then dried under vacuum (10$^{-2}$ bar, 40° C.). The poly(VDF-co-TFMA-tBu)-b-PVDF block copolymer is a brownish powder, obtained at a yield of 48%. It is characterized by $^1$H and $^{19}$F NMR spectroscopy.

$^1$H NMR (d₆ acetone) δ (ppm): 3.65 (—CH₂C(CF₃)COOtBu of TFMA-tBu); 2.95 (sequence of normal PVDF chains of VDF-VDF dyads in the block copolymer); 2.4 (CH₂ of the VDF inversion of the VDF-VDF dyads in the copolymer); 1.4 (tert-butyl —C(CH₃)₃) of TFMA-tBu).

$^{19}$F NMR (acetone) δ (ppm): −114 and −116 (addition of the VDF head to head, chain defect); −91.5 (CF₂ in PVDF block); −93 (CF₂ of VDF, normal addition of the dyads head-to-tail); −95 (CF₂ of the VDF in the VDF-TFMA-tBu dyads); −68 (perfluoromethyl groups of the TFMA-tBu units). This spectrum is shown at the bottom of FIG. 34.

FT-IR (cm$^{-1}$)=2985 (str, C—H), 1723 (str, C=O), 1305-1050 (str, C—F), 858 (vs, C=S), 768 (w, C—O).

GPC: $M_n$=3100 g·mol$^{-1}$, $M_w$=4600 g·mol$^{-1}$, PDI=1.5. TGA (in air, 5° C. min$^{-1}$) $T_{d,10\%}$=231° C. Contact angle of a water drop=108°.

The SEC chromatogram is shown in FIG. 35 (dotted curve).

What is claimed is:

1. A method of preparing a block copolymer, comprising the step of reacting a random copolymer of vinylidene fluoride and α-trifluoromethacrylic acid or derivative of α-trifluoromethacrylic acid, having a xanthate or trithiocarbonate termination (a), with a comonomer (b), wherein comonomer (b) is one or more monomers selected from the group consisting of vinylidene fluoride, vinyl acetate, N-vinyl pyrrolidone, methacrylates, acrylates, acrylamide and its derivatives, N-vinylcarbazole and acrylonitrile.

2. The method of claim 1, wherein said copolymer (a), in which the xanthate or trithiocarbonate termination comprises a group —S—C(=S)—Z, wherein —Z represents either a group —O—R₂ in which R₂ represents an alkyl or aryl group having from 1 to 10 carbon atoms, or —Z represents a group —SR₃, in which R₃ represents an aliphatic group having from 1 to 20 carbon atoms.

3. The method of claim 1, wherein said copolymer (a), in which the xanthate termination, if present, comprises a group —S—C(=S)—O—C₂H₅, and wherein the trithiocarbonate, if present, is SC(S)S[VDF-co-TFMA-tBu]$_n$R₅, R₄ and R₅ being alkyl groups that can be partially halogenated.

4. The method of claim 1, wherein said copolymer (a), comprises vinylidene fluoride and α-trifluoromethacrylate ester selected from the group consisting of t-butyl α-trifluoromethacrylate, ethyl α-trifluoromethacrylate, α-trifluoromethyl methacrylate, 2,2,2-trifluoroethyl α-trifluoromethacrylate and hexafluoroisopropyl α-trifluoromethacrylate.

5. The method according to claim 1, in which the xanthate or trithiocarbonate termination of copolymer (a) is a group —S—C(=S)—O—C₂H₅.

6. The method according to claim 1, further comprising a preliminary step of copolymerizing a vinylidene fluoride monomer with an α-trifluoromethacrylic acid monomer or derivative of α-trifluoromethacrylic acid, in the presence of a xanthate or trithiocarbonate compound, or mixtures thereof.

* * * * *